US012587365B2

(12) United States Patent
Goodman et al.

(10) Patent No.: US 12,587,365 B2
(45) Date of Patent: Mar. 24, 2026

(54) SECRET MANAGEMENT IN DISTRIBUTED SYSTEMS

(71) Applicant: Dell Products L.P., Round Rock, TX (US)

(72) Inventors: Bradley K. Goodman, Nashua, NH (US); Joseph Caisse, Burlington, MA (US); Eric Joseph Bruno, Shirley, NY (US)

(73) Assignee: Dell Products L.P., Round Rock, TX (US)

( * ) Notice: Subject to any disclaimer, the term of this patent is extended or adjusted under 35 U.S.C. 154(b) by 251 days.

(21) Appl. No.: 18/359,443

(22) Filed: Jul. 26, 2023

(65) Prior Publication Data

US 2025/0038961 A1     Jan. 30, 2025

(51) Int. Cl.
*H04L 29/06*       (2006.01)
*H04L 9/08*        (2006.01)
(52) U.S. Cl.
CPC .......... *H04L 9/0825* (2013.01); *H04L 9/0894* (2013.01)
(58) Field of Classification Search
None
See application file for complete search history.

(56) References Cited

U.S. PATENT DOCUMENTS

| | | | |
|---|---|---|---|
| 10,020,939 | B2 | 7/2018 | Lee |
| 10,038,723 | B2 | 7/2018 | Gustafsson |

| | | | | |
|---|---|---|---|---|
| 11,218,324 | B2 | 1/2022 | Wentz | |
| 11,405,200 | B1 * | 8/2022 | Hamel | H04L 9/0822 |
| 11,449,797 | B1 | 9/2022 | Kurniawan | |
| 11,487,708 | B1 | 11/2022 | Dangi | |
| 11,620,363 | B1 | 4/2023 | Woodward | |
| 11,711,401 | B2 | 7/2023 | Solari | |
| 11,763,002 | B2 | 9/2023 | Smith | |
| 11,882,117 | B1 | 1/2024 | Kumar | |
| 12,238,085 | B1 | 2/2025 | Yancey | |
| 12,455,566 | B2 | 10/2025 | Cristache | |
| 2009/0222674 | A1 | 9/2009 | Leichsenring | |
| 2012/0173874 | A1 | 7/2012 | Brown | |
| 2013/0036476 | A1 | 2/2013 | Roever | |
| 2014/0086177 | A1 | 3/2014 | Adjakple | |

(Continued)

OTHER PUBLICATIONS

"BitLocker and Distributed Key Manager (DKM) for Encryption," Microsoft, Jul. 21, 2023, Web Page <https://learn.microsoft.com/en-us/purview/office-365-bitlocker-and-distributed-key-manager-for-encryption> accessed on Jul. 26, 2023 (2 Pages).

(Continued)

*Primary Examiner* — Andrew J Steinle
(74) *Attorney, Agent, or Firm* — WOMBLE BOND DICKINSON (US) LLP

(57)     ABSTRACT

Methods and systems for managing secrets are disclosed. To manage secrets, backups of the secrets may be obtained to facilitate future recoveries of the secrets. While backed up, the secrets may be secured with a security model. The security model may prescribe how entities that manage the backups are to operate, how encryption and decryption keys are maintained, and how various copies of the backed up secrets are to be distributed to manage potential loss of various backups of the secrets. When access to a secret is lost, a recovery may be performed using a corresponding backup of the secret.

20 Claims, 11 Drawing Sheets

(56) References Cited

U.S. PATENT DOCUMENTS

| | | |
|---|---|---|
| 2015/0032627 A1 | 1/2015 | Dill |
| 2015/0121554 A1 | 4/2015 | Trimper |
| 2015/0310229 A1 | 10/2015 | Rohleder |
| 2016/0164750 A1 | 6/2016 | Holkkola |
| 2017/0041296 A1 | 2/2017 | Ford |
| 2017/0134429 A1 | 5/2017 | Gustafsson |
| 2017/0272317 A1 | 9/2017 | Singla |
| 2017/0289060 A1 | 10/2017 | Aftab |
| 2017/0302532 A1 | 10/2017 | Maes |
| 2018/0316510 A1 | 11/2018 | Rai |
| 2019/0014117 A1 | 1/2019 | Li |
| 2019/0312857 A1 | 10/2019 | Lander |
| 2019/0364154 A1 | 11/2019 | Hermanek |
| 2020/0052905 A1 | 2/2020 | Mathias |
| 2020/0084202 A1 | 3/2020 | Smith |
| 2020/0244652 A1 | 7/2020 | Iyer |
| 2020/0275273 A1 | 8/2020 | Smith |
| 2020/0327231 A1 | 10/2020 | Smith |
| 2021/0091930 A1 | 3/2021 | Visoky |
| 2021/0112034 A1 | 4/2021 | Sundararajan |
| 2021/0112411 A1 | 4/2021 | Pazhyannur |
| 2021/0120408 A1 | 4/2021 | Pazhyannur |
| 2021/0160231 A1 | 5/2021 | Kumar |
| 2021/0320789 A1* | 10/2021 | Medvinsky ......... H04L 63/0884 |
| 2021/0336966 A1 | 10/2021 | Gujarathi |
| 2021/0349970 A1 | 11/2021 | Shamsaasef |
| 2021/0373905 A1 | 12/2021 | Sayyed |
| 2021/0397726 A1 | 12/2021 | Kulaga |
| 2022/0028505 A1 | 1/2022 | Colburn |
| 2022/0131691 A1 | 4/2022 | Gupta |
| 2022/0239504 A1* | 7/2022 | Rothschild ........... H04L 9/0825 |
| 2022/0240083 A1 | 7/2022 | Goel |
| 2022/0393883 A1 | 12/2022 | Panchamia |
| 2022/0394028 A1 | 12/2022 | Panchamia |
| 2022/0398913 A1 | 12/2022 | White |
| 2023/0120534 A1 | 4/2023 | Jakobsson |
| 2023/0273977 A1 | 8/2023 | Marando |
| 2023/0325535 A1 | 10/2023 | Sharma |
| 2023/0394493 A1 | 12/2023 | Rao |
| 2023/0412396 A1 | 12/2023 | Bommisetty |
| 2023/0413052 A1 | 12/2023 | Aggarwal |
| 2024/0114342 A1 | 4/2024 | Jaskolski |
| 2024/0129136 A1 | 4/2024 | Chao |
| 2024/0188151 A1 | 6/2024 | Garcia |
| 2024/0333706 A1 | 10/2024 | Mohammed |
| 2024/0388510 A1 | 11/2024 | Madtha |
| 2025/0008379 A1 | 1/2025 | Lal |
| 2025/0030561 A1 | 1/2025 | Long |
| 2025/0045435 A1 | 2/2025 | Goodman |
| 2025/0062980 A1 | 2/2025 | Zhan |
| 2025/0069054 A1 | 2/2025 | Elbizri |
| 2025/0070988 A1 | 2/2025 | Sun |
| 2025/0201066 A1 | 6/2025 | Higgins |
| 2025/0310179 A1 | 10/2025 | Pergament |
| 2025/0336409 A1 | 10/2025 | Hayun |

OTHER PUBLICATIONS

Nadeem et al., "A Case for Microservices Orchestration Using Workflow Engines", 2022 IEEE/ACM 44th International Conference on Software Engineering: New Ideas and Emerging Results, pp. 6-10 (Year: 2022).

Banati, A, Kail, E., Kar6czkai, K. and Kozlovszky, M., 2018, May. "Authentication and authorization orchestrator for microservice-based software architectures." In 2018 41st International Convention on Information and Communication Technology, Electronics and Microelectronics (MIPRO) (pp. 1180-1184). (Year: 2018) (6 pages).

Kubovy, J., Huber, C., Jager, M. and Kung, J., Oct. 2016. "A secure token-based communication for authentication and authorization servers." In International Conference on Future Data and Security Engineering (pp. 237-250). Cham: Springer International Publishing. (Year: 2016) (16 pages).

Zarakovitis, Charilaos C. et al. "Three-dimensional Access Point Assignment in Hybrid VLC, mmWave and Wi Fi Wireless Access Networks." ICC 2020—2020 IEEE International Conference on Communications (ICC). https://ieeexplore.ieee.org/stamp/stamp.jsp?tp=&arnumber=9148722 (Year: 2020) (6 pages).

Makris, Nikos et al. "Service Orchestration Over Wireless Network Slices: Testbed Setup and Integration." IEEE Transactions on Network and Service Management, vol. 18, Issue: 1. https://ieeexplore.ieee.org/stamp/stamp.jsp?tp=&arnumber-9296280 (Year: 2020) (16 pages).

Zang, Yunpeng et al. "Opportunistic Wireless Internet Access in Vehicular Environments Using Enhanced WAVE Devices." Future Generation Communication and Networking (FGCN 2007). https://ieeexplore.ieee.org/stamp/stamp.jsp?tp=&arnumber-4426163 (Year: 2007) (6 pages).

* cited by examiner

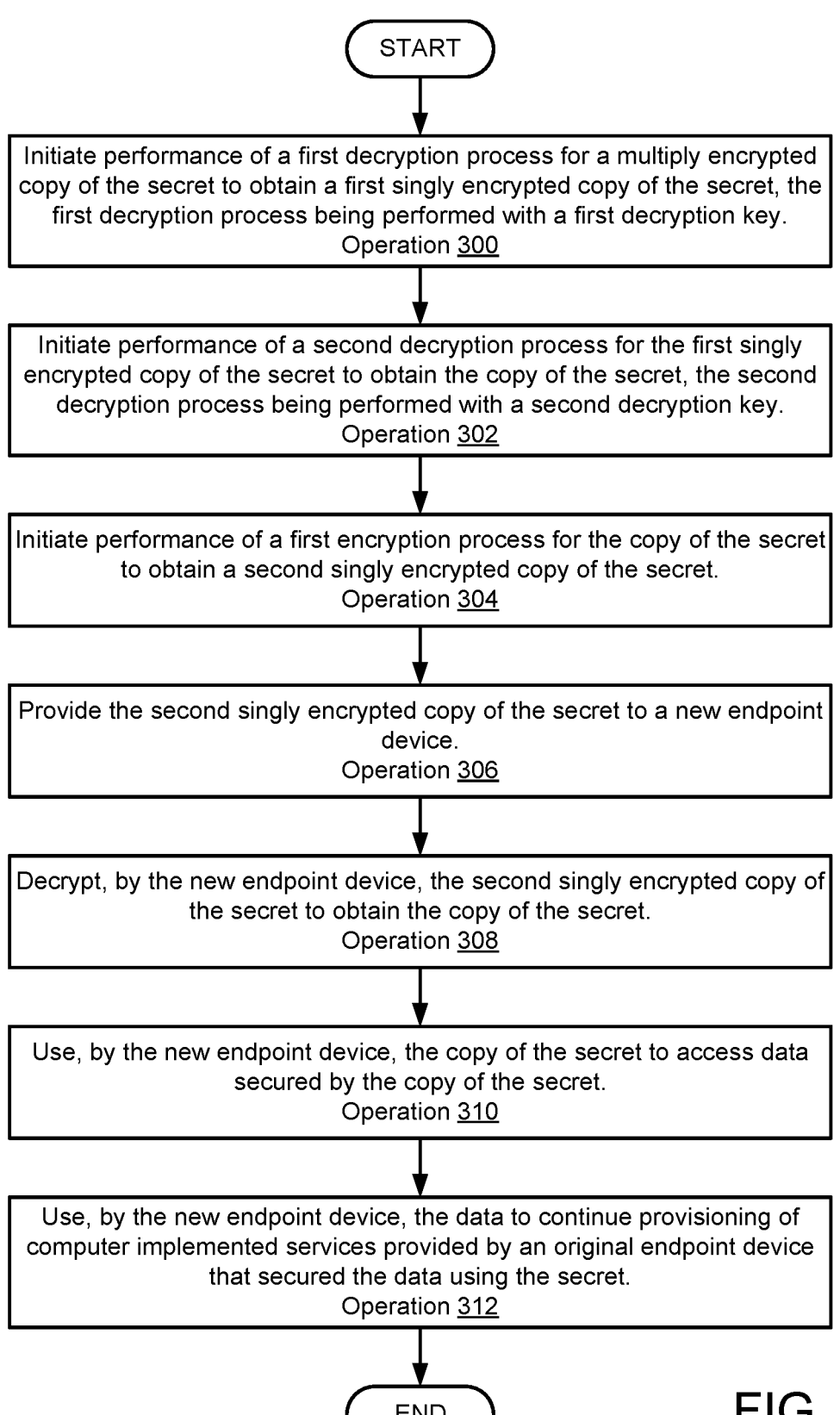

START

Initiate performance of a first decryption process for a multiply encrypted copy of the secret to obtain a first singly encrypted copy of the secret, the first decryption process being performed with a first decryption key.
Operation 300

Initiate performance of a second decryption process for the first singly encrypted copy of the secret to obtain the copy of the secret, the second decryption process being performed with a second decryption key.
Operation 302

Initiate performance of a first encryption process for the copy of the secret to obtain a second singly encrypted copy of the secret.
Operation 304

Provide the second singly encrypted copy of the secret to a new endpoint device.
Operation 306

Decrypt, by the new endpoint device, the second singly encrypted copy of the secret to obtain the copy of the secret.
Operation 308

Use, by the new endpoint device, the copy of the secret to access data secured by the copy of the secret.
Operation 310

Use, by the new endpoint device, the data to continue provisioning of computer implemented services provided by an original endpoint device that secured the data using the secret.
Operation 312

END

FIG. 3

SECRET MANAGEMENT IN DISTRIBUTED SYSTEMS

FIELD

Embodiments disclosed herein relate generally to security. More particularly, embodiments disclosed herein relate to backing up secrets used by devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 3 shows a flow diagram illustrating method in accordance with an embodiment.

DETAILED DESCRIPTION

Figure 1:
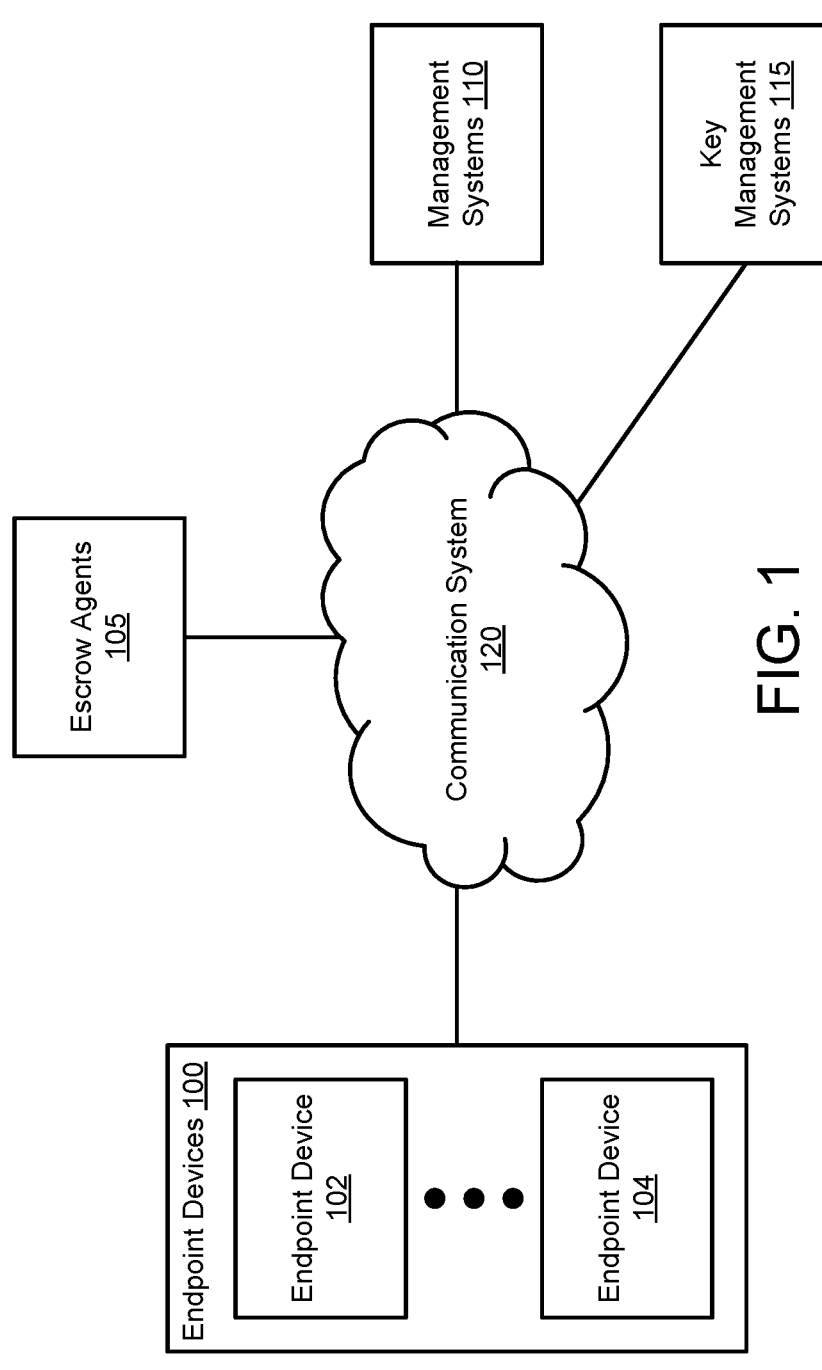
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for facilitating recovery of secrets. To facilitate recovery of secrets, backups of the secrets may be generated and escrowed for future use.

During generation and while escrowed, a security model may be enforced. The security model may place restrictions on the security posture of devices participating in the processes, and limits on how decryption keys for the backups are retained. By doing so, undesired access to the secrets may be limited.

When access to a secret is lost, the backup may be used to restore access. To improve the likelihood of being able to restore access using the backup of the secret, a protection pipeline established to generate and maintain the secrets may be monitored for compliance with protection pipeline definitions. The protection pipeline definitions may set expectations regarding readiness for performing recoveries. If deviations from the protection pipeline definitions is identified, remediations may be automatically performed to return to compliance.

Using the backup of the secret, the secret may be recovered and deployed to a device. Once deployed, the secret may be used to facilitate, for example, access to data previously secured using the secret.

During recovery of the secret, multiple layers of encryption may be sequentially removed until the secret is recovered. To deploy the secret to the target device, the secret may be re-encrypted and sent to the device which may decrypt and use the secret.

By doing so, embodiments disclosed herein may facilitate secure backup of secrets. Consequently, future access to secrets may be improved even when hardware components that otherwise safeguard the secrets become inoperable.

In an embodiment, a method for managing a secret in a distributed system is provided. The method may include initiating performance of a first decryption process for a multiply encrypted copy of the secret to obtain a first singly encrypted copy of the secret, the first decryption process being performed with a first decryption key; initiating performance of a second decryption process for the first singly encrypted copy of the secret to obtain the copy of the secret, the second decryption process being performed with a second decryption key; initiating performance of a first encryption process for the copy of the secret to obtain a second singly encrypted copy of the secret; providing the second singly encrypted copy of the secret to a new endpoint device; decrypting, by the new endpoint device, the second singly encrypted copy of the secret to obtain the copy of the secret; using, by the new endpoint device, the copy of the secret to access data secured by the copy of the secret; and using, by the new endpoint device, the data to continue provisioning of computer implemented services provided by an original endpoint device that secured the data using the secret.

The method may also include, prior to initiating the performance of the first decryption process: multiply encrypting, by the original endpoint device, the secret using at least two public keys to obtain the multiply encrypted secret; and remotely escrowing the multiply encrypted secret.

The at least two public keys may include a first public key that is a member of a first key pair comprising the first decryption key and a second public key that is a member of a second key pair comprising the second decryption key.

The second decryption key may be a private key maintained by an escrow agent. The escrow agent may perform the second decryption process and the first encryption process.

The first encryption process may be performed using a public key for the new endpoint device.

The method may also include, prior to multiply encrypting the secret: identifying a security posture of a second escrow agent; and making a determination whether the security posture of the second escrow agent meets a security poster criteria; in a first instance of the determination where the security posture of the second escrow agent does not meet the security posture criteria: identifying a security posture of the escrow agent; and making a determination whether the security posture of the escrow agent meets a security posture criteria; in a first instance of the determination where the security posture of the escrow agent meets the security posture criteria: selecting the escrow agent over the second escrow agent for membership in a protection pipeline used to protect the secret.

The method may further include, after obtaining the first singly encrypted copy of the secret: storing the first singly encrypted copy of the secret with the escrow agent until an occurrence of a restoration event for the secret. The performance of the second decryption process may be initiated responsive to the occurrence of the restoration event.

The restoration event may be a selection of the new endpoint device as a replacement for the original endpoint device, and the new endpoint device may be selected for replacement due to a failure of at least a secret management component of the original endpoint device that maintained the secret for the original endpoint device.

The multiply encrypted copy of the secret may be obtained through encryption using at least two encryption keys, the at least two encryption keys may be public keys for at least two endpoint devices, and the at least two endpoint devices may each meeting security posture requirements for serving as escrow agents for the secret.

The secret may be a volume management key.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include endpoint devices 100. Each endpoint device (e.g., 102, 104) may provide similar and/or different computer implemented services, and may provide the computer implemented services independently and/or in cooperation with other endpoint devices.

When providing the computer implemented services, endpoint device 100 may utilize secrets. The secrets may include symmetric and/or asymmetric keys. The keys may be used, for example, to encrypt data stored in storage of endpoint device 100, to create cryptographically verifiable signatures (e.g., to authenticate the endpoint device and/or state of operation of the endpoint device to another device), and/or for other purposes.

To manage the secrets, endpoint devices 100 may each include a trusted platform module (TPM) or other types of hardware devices for managing secrets. The TPM may limit use of the secrets based on the security posture of a host endpoint device. By doing so, the impact of a compromised endpoint device may be reduced by limiting and/or preventing use of the secrets by the compromised device.

However, if a TPM becomes damaged such that the secrets that it protects become unusable by the host data processing system, then the ability of the endpoint device to provide the computer implemented services may be impacted. For example, the TPM may protect volume management keys (VMKs), which may be used to encrypt stored data. If the VMKs become unusable, then encrypted stored data may not be decrypted thereby limited access to the stored data. Secrets protected by TPMs may be used for other purposes without departing from embodiments disclosed herein. Regardless of which secrets are unable to be used, the computer implemented services may be impacted (e.g., may be prevented from providing some or all desired computer implemented services which depend on use of the secrets).

If secrets maintained by a TPM becomes unusable (due to impairment of the TPM and/or host endpoint device), the TPM may be replaced with a different TPM or the host endpoint device for the TPM may be replaced with another endpoint device having a different TPM. However, the different TPM may not have the secrets protected by the now unusable TPM. Consequently, the different TPM may not facilitate use of the secrets necessary for the computer implemented services to be provided.

In general, embodiments disclosed herein may provide methods, systems, and/or devices for managing secrets used by endpoint devices. To manage the secrets used by the endpoint devices, backups of the secrets may be made and used to restore future use of the secrets.

However, to backup the secrets, the secrets may be exported from a TPM. Once exported, the exported secrets may not be protected by the TPM. Consequently, if obtained by a malicious entity, the secrets may be used to compromise various aspects of operation of a distributed system.

To reduce the likelihood of the exported secrets being obtained by malicious entities, the secrets may be managed in accordance with a security model. The security model may facilitate generation and storage of payloads in a manner that reduces risk of secrets included in the payloads being obtained by malicious entities. For example, the security model may require that (i) devices that handle the payloads meet security posture requirements, (ii) devices that handle the payloads meet separation requirements between decryption keys usable to obtain the secrets from the payloads, (iii) payloads provide a prescribed level of protection for secrets included therein, (iv) distributions of payloads are likely to preclude loss of all payloads from which a particular secret may be retrieved, and/or may impose other types of requirements on devices that handle and payloads that include secrets. By meeting these requirements of the security model, the secrets exported from a TPM may be less likely to be obtained by a malicious entity.

To facilitate recovery of secrets, information regarding how payloads are generated and stored may be retained by the system. The system may track changes in the system over time (e.g., various devices becoming inoperable and new devices joining) to ensure that the manner in which the payloads are retained are sufficiently likely to enable recovery of the secrets in the future. For example, when a secret is stored in a payload, the manner of storage may be established based on a level of protection for the secret. To improve the likelihood, additional copies of the secret may be added to payloads which may be stored in different devices there reducing the likelihood of all copies of the secret from being lost when devices fail over time.

Additionally, the manner in which the payloads are generated and stored may be established to meet security requirements for the secret. To protect the secrets, the secrets may be multiple encrypted any number of times. Each layer of encryption may require participation of a corresponding device to remote. Thus, by increasing the number of layers of encryption applied to a secret, correspondingly greater numbers of devices may need to come to a consensus (e.g., to decrypt the layers of encryption) regarding whether the secret should be made available. Accordingly, compromise of devices may be less likely to result in compromise of corresponding secrets stored in payloads.

Once stored, the secrets may be retrieved from the payloads through a distributed process. Different devices that how decryption keys for corresponding layers of encryption applied to the secrets may participate in the decryption until the secret is available. Once made available, the secret may be encrypted and transmitted to a destination device that holds a corresponding decryption key.

By doing so, embodiments disclosed herein may manage secrets used by endpoint in a manner that reduces their likelihood of compromise while enabling the secrets to be recovered. Consequently, a distributed system in accordance with an embodiment may be more resilient to failures of devices and components thereof such as TPMs. For example, failures of such devices may be less likely to result in data loss by preserving access to VMKs even when the TPMs that protect them become inoperable.

To provide the above noted functionality, the system of FIG. 1 may include endpoint devices 100, escrow agents 105, management systems 110, key management systems 115, and communication system 120. Each of these components is discussed below.

Figure 2A:
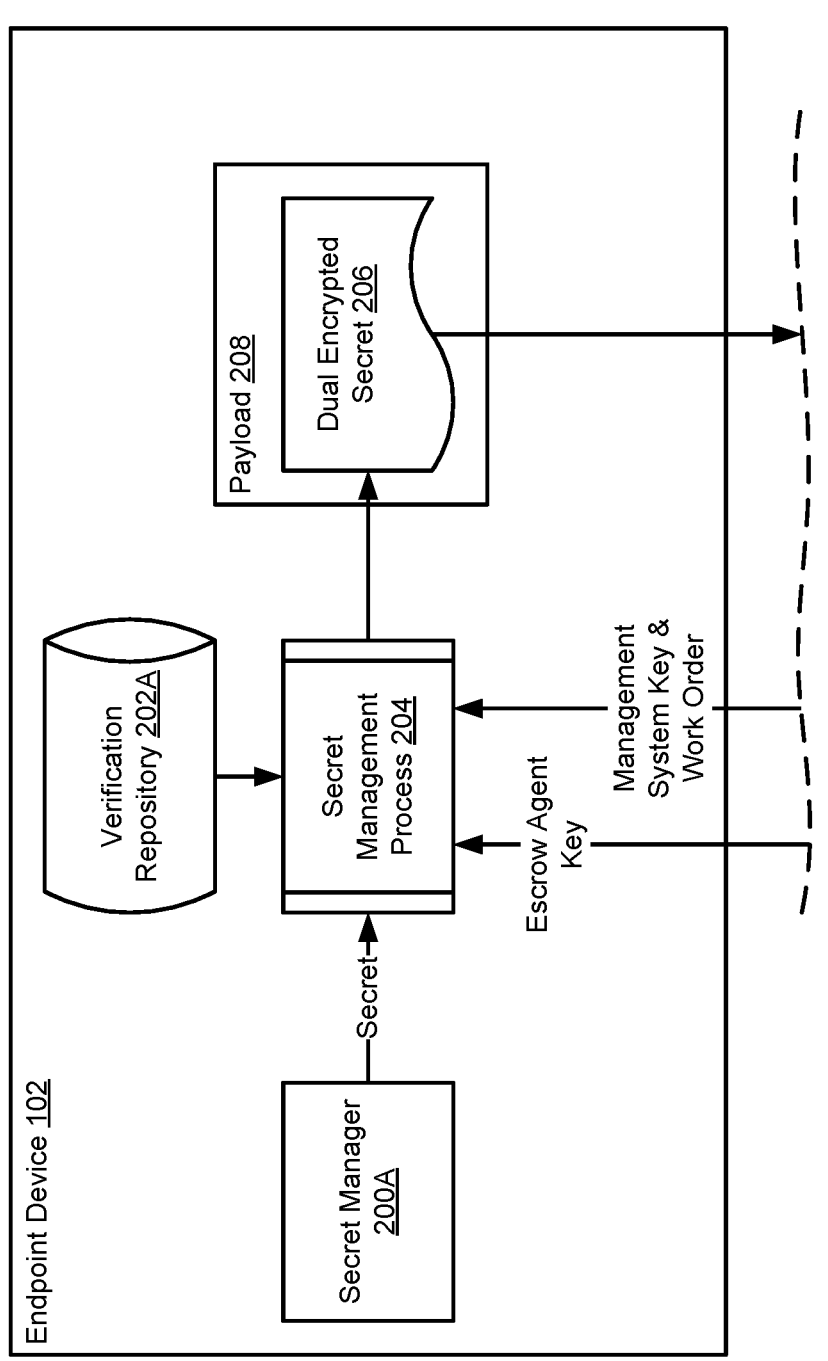
FIGS. 2A-2H show data flow diagrams in accordance with an embodiment.

Endpoint devices 100 may provide computer implemented services using one or more secrets. The secrets may be managed by TPMs which may become inaccessible. To reduce the impact of failures of the TPMs and/or devices that host the TPMs, endpoint devices 100 may participate in backup generation processes for the secrets. During the backup generation processes, endpoint devices 100 may (i) verify work orders for performance of the backup generation processes, (ii) presuming the work orders can be verified, export secrets from the TPMs, (iii) multiply encrypt the secrets using one or more keys (e.g., public keys from other entities participating in an backup pipeline) to obtain a payload, and (iv) forward the payload to another device for escrow. By doing so, a backup (e.g., the payload) of the secret may be established. Additionally, to comply with the security model, endpoint devices 100 may (i) verify that the security postures of other devices participating in the backup pipeline meet posture criteria (e.g., a nominal posture), and (ii) may not have access to the decryption keys for the encryption keys used to multiply encrypt the secrets. Refer to FIGS. 2A and 2E for additional details regarding obtaining payloads.

Endpoint devices 100 may also participate in recovery processes for secrets. During the recovery processes, endpoint devices 100 (e.g., acting as a new endpoint device for a secret) may (i) obtain a payload with a singly encrypted secret, (ii) decrypt the singly encrypted secret to obtain a secret, and (iii) use the secret to perform various processes. For example, once obtained, the secret may be entrusted to a secret manager (e.g., a TPM) for retention, the secret may be used to decrypt encrypted data and/or authenticate the endpoint device to other devices, etc. Endpoint devices 100 may include any number of endpoint devices (e.g., 102-104). Refer to FIGS. 2B-2C and 2F-2G for additional details regarding obtaining secrets from payloads.

Escrow agents 105 may escrow payloads (e.g., store them) and facilitate recovery of secrets using the payloads. To facilitate recovery of secrets, escrow agents 105 may cooperatively decrypt multiply encrypted secrets in payloads, temporarily re-encrypt the secret using a public key of a device for which the recovery is performed, and provide the re-encrypted secret to the device (e.g., any of endpoint devices 100). Refer to FIGS. 2B-2C and 2F-2G for additional details regarding obtaining secrets from payloads.

Additionally, escrow agents 105 may participate in payload generation through distribution of public keys used to multiply encrypt secrets in payloads. Refer to FIGS. 2A and 2E for additional details regarding obtaining payloads.

Escrow agents 105 may be implemented using any of endpoint devices 100. For example, an endpoint device that demonstrates that it has a prescribed security posture may be used as an escrow agent.

Management systems 110 may initiate backup of secrets and restoration of secrets. For example, an administrator may use any of management systems 110 to send commands to start backups and/or restorations of secrets. The commands may be distributed to the components of FIG. 1 which may cooperatively perform the backups and/or restorations. Additionally, payloads may be temporarily escrowed with management systems 110. For example, after a payload is generated, the payload may be stored with management systems 110. To facilitate generation of the payloads, management systems 110 may distribute an encryption key (e.g., a public key of a keypair) to an endpoint device 102 performing a backup. The encryption key may be used to establish an outer layer of encryption, while escrow agents 105 may provide encryption keys used to establish inner layers of encryption. Consequently, during secret restoration, management systems 110 may initially decrypt the outer layer of encryption followed by decryption of the inner layers by escrow agents 105. However, it will be appreciated that management systems 110 may not participate in backup and restoration of secrets (e.g., other than initiation, confirmation, etc. but may not perform active escrow, encryption/decryption, etc.). Refer to FIG. 2D for additional details regarding initiating performance of backups for secrets.

Key management systems 115 may provide package and readiness state management services. The package management services may track the status of packages and escrow agents that are able to decrypt the packages, track the status of backups and restorations of secrets, and/or otherwise manage backup, restoration, and escrow processes. For example, during a backup, key management systems 115 may (i) document where packages are stored, (i) how the packages may be used to perform restorations, and (iii) expected readiness levels of the system to perform restorations. Once stored, key management systems 115 may track the state of the system of FIG. 1 to determine whether it has fallen below the expected readiness levels (e.g., levels of redundancy for packages, escrow agents, etc.). If it has, key management systems 115 may automatically and/or semi-automatically (e.g., under user supervision) initiate processes to return the system to compliance.

For example, if insufficient numbers of packages are stored in a required degree of separation across different fault domains, key management systems 115 may automatically (i) initiate generation of new packages, (ii) initiate migration of packages to other locations, and/or initiate other types of remedial action to meet readiness level expectations.

Figure 2B:
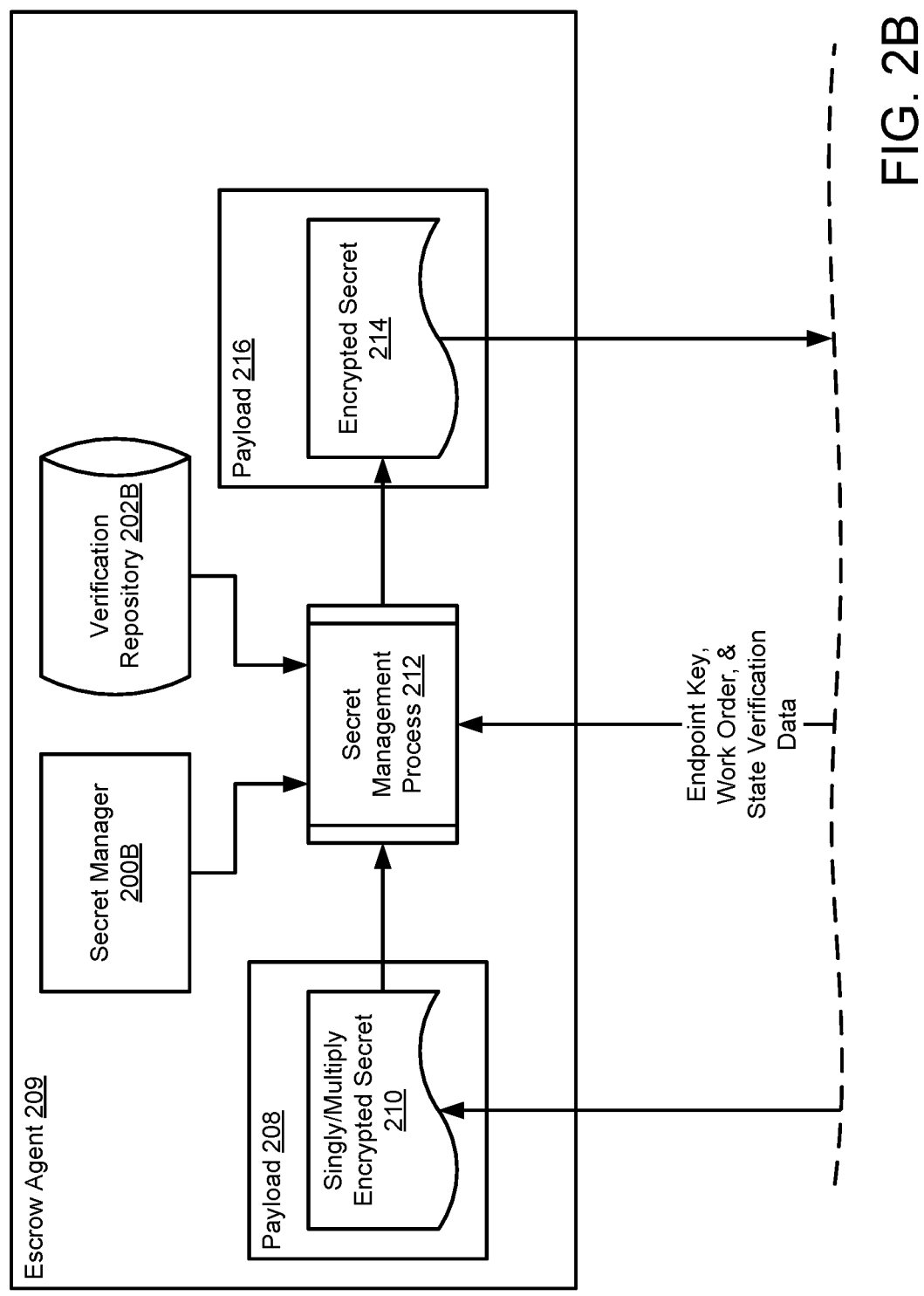
Figure 2C:
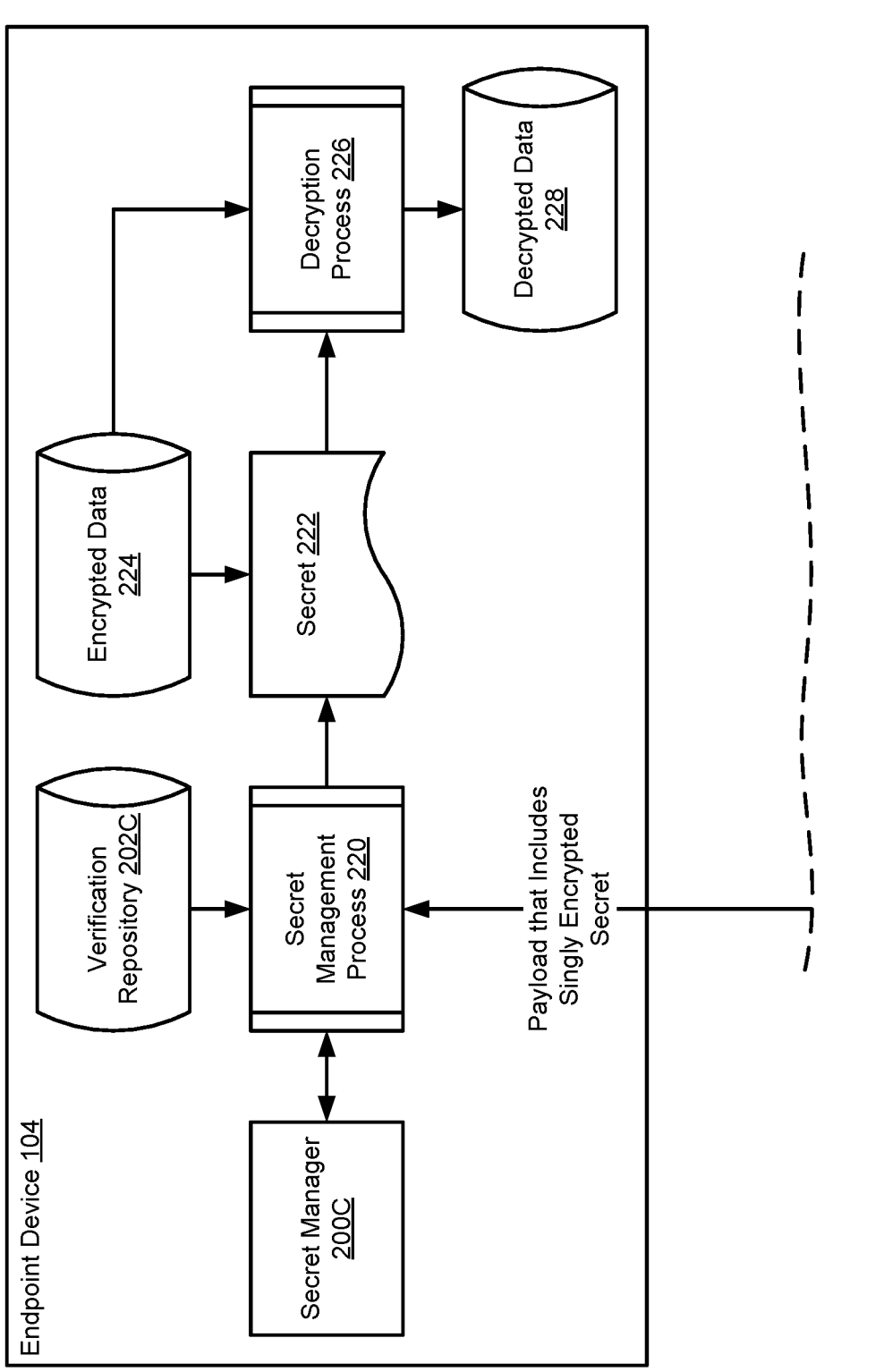
Figure 2D:
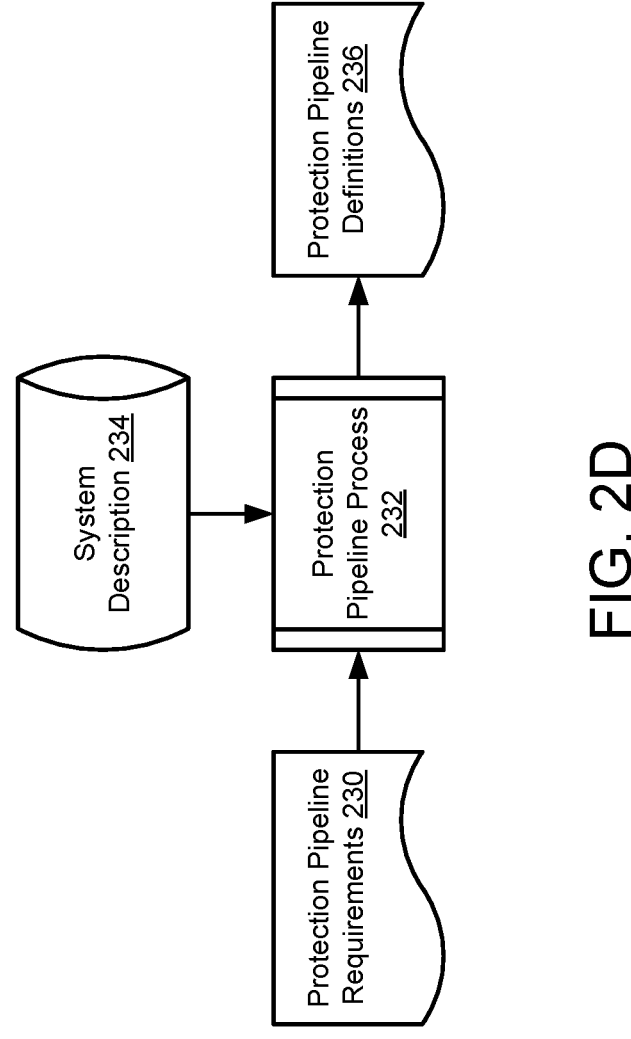
Figure 2E:
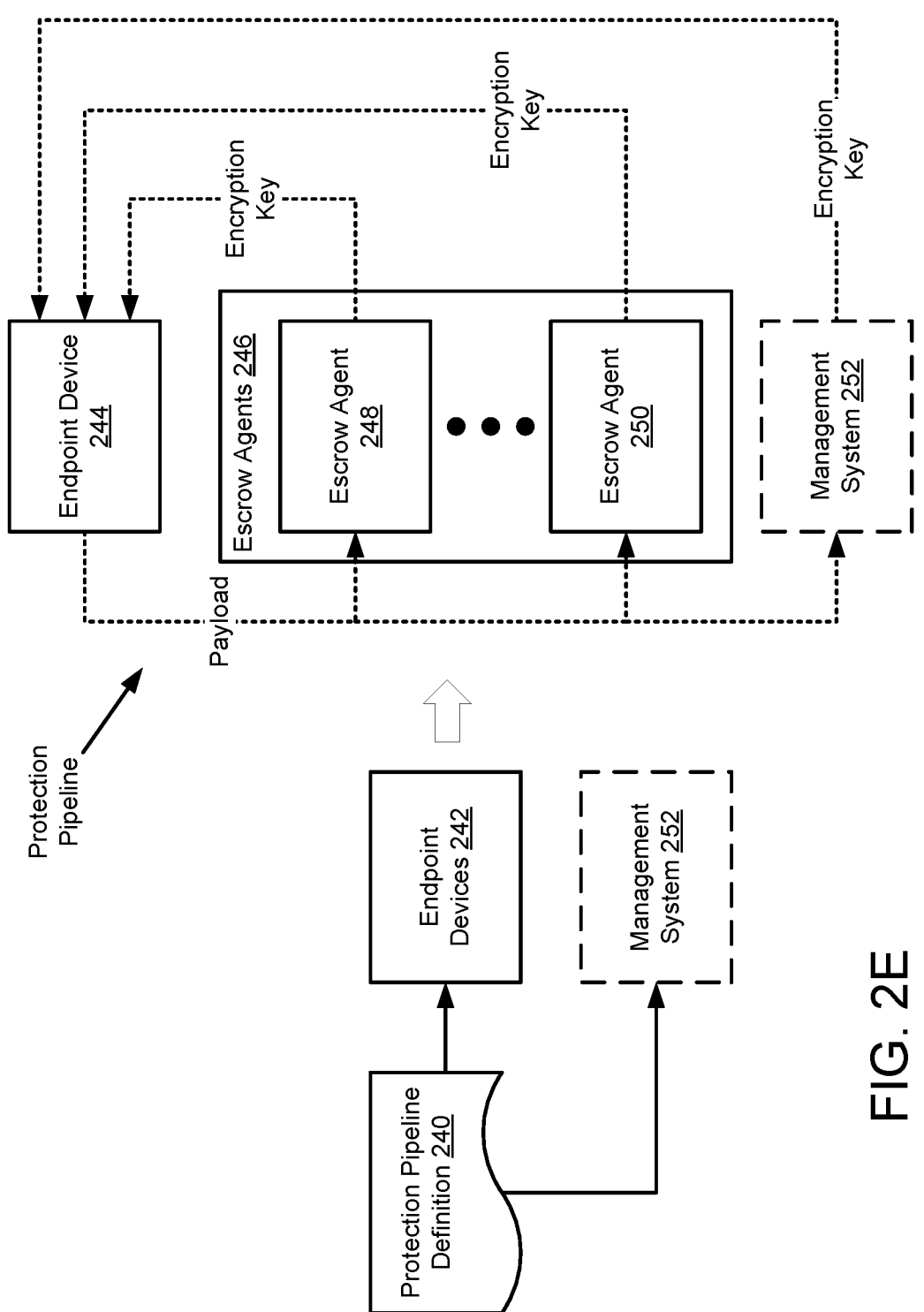
Figure 2F:
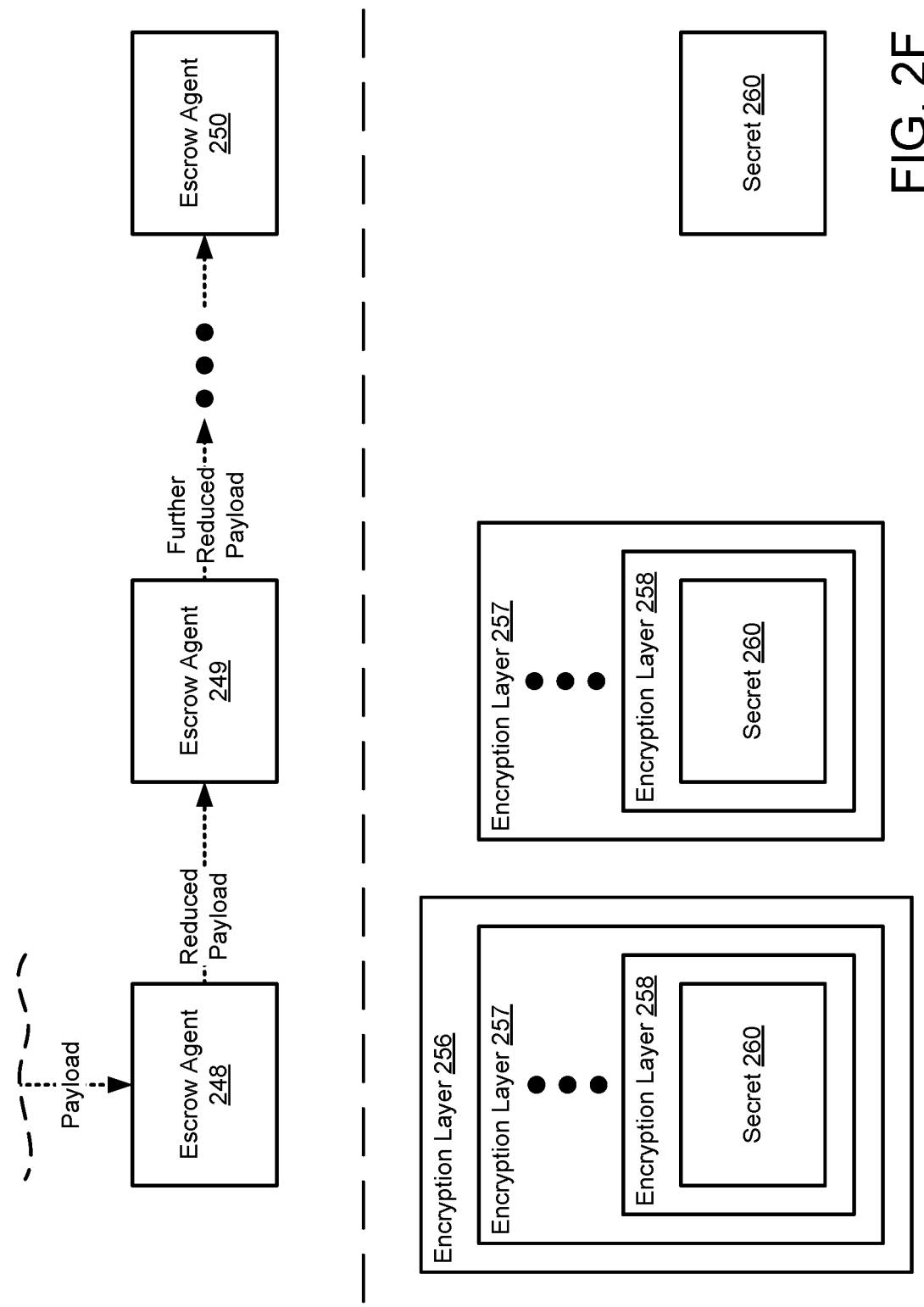
Figure 2G:
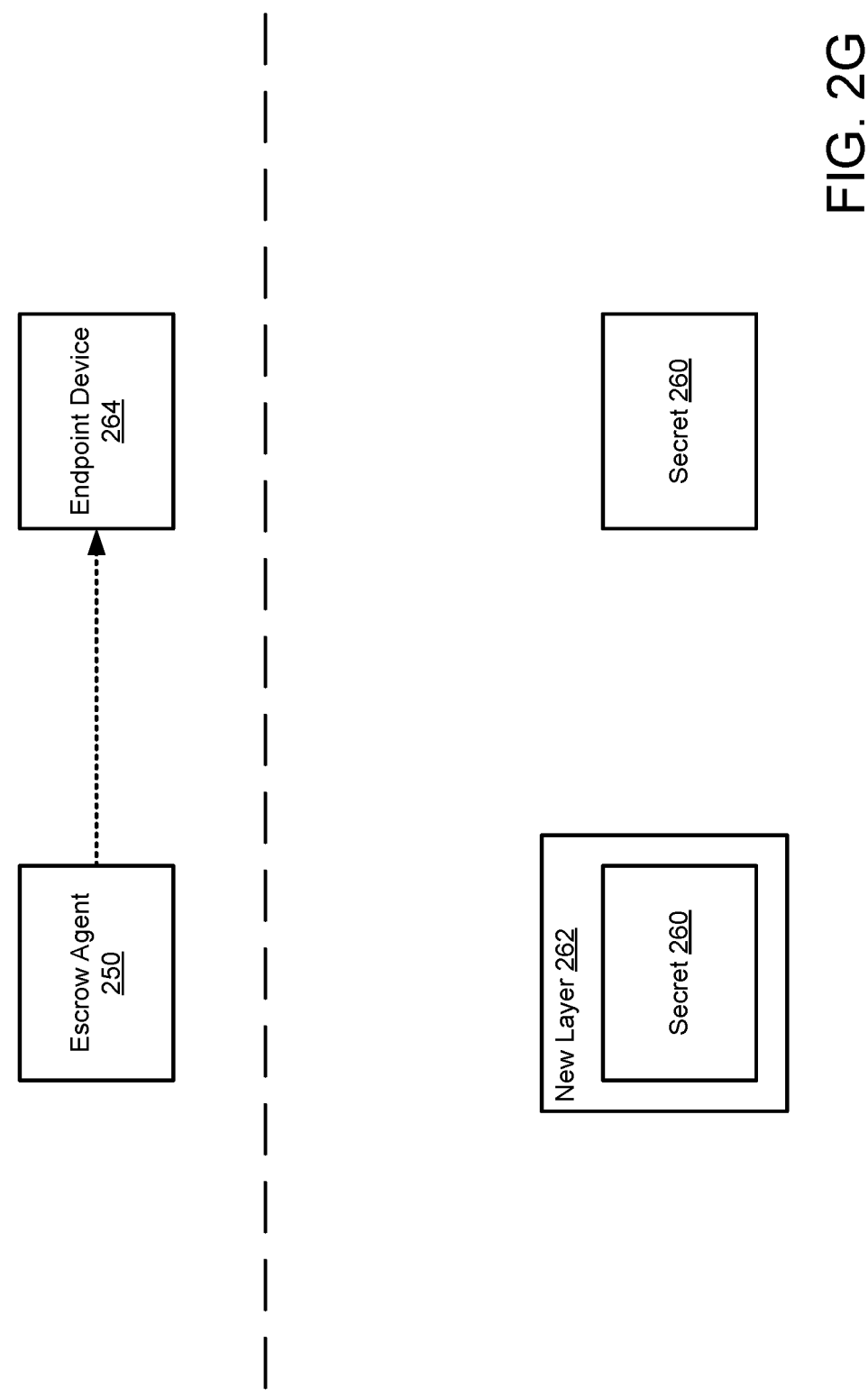
Figure 2H:

Refer to FIGS. 2D and 2H for additional information regarding package and readiness state management.

When providing their functionality, any of (and/or components thereof) endpoint devices 100, escrow agents 105, management systems 110, key management systems 115, and/or other components may perform all, or a portion, of the method illustrated in FIG. 3.

Any of (and/or components thereof) endpoint devices 100 and management system 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those components illustrated therein.

To further clarify embodiments disclosed herein, data flow diagrams in accordance with an embodiment are shown in FIGS. 2A-2H. In these diagrams, flows of data and processing of data are illustrated using different sets of shapes. A first set of shapes (e.g., 222, etc.) is used to represent data structures, a second set of shapes (e.g., 210, 216, etc.) is used to represent processes performed using and/or that generate data, and a third set of shapes (e.g., 214) is used to represent large scale data structures such as databases.

Turning to FIG. 2A, a first data flow diagram in accordance with an embodiment is shown. The first data flow diagram may illustrate data used in and data processing performed in backing up a secret of an endpoint device.

To initiate backing up of the secret, a key management system or other type of device may generate and send a cryptographically verifiable work order for the backup process to an endpoint device (e.g., 102 in this example). Once verified (e.g., using data stored in verification repository 202A, such as trusted public keys usable to verify a signature of the work order), endpoint device 102 may initiate backing up of the secret. Other devices may include similar repository (e.g., 202B shown in FIG. 2B), but each repository may include similar or different types of verification information such as public keys, attestations, etc.

The secret may be, for example, a volume management key or other type of secret protected by a secret manager (e.g., 200A) such as a trusted platform module of endpoint device 102. Other devices may include similar secret managers (e.g., 200B), but each secret manager may protect different secrets (e.g., private keys used as decryption keys, to generate signatures, etc.).

To generate a backup of the secret, endpoint device 102 may perform secret management process 204. During secret management process 204, endpoint device 102 may obtain encryption keys (escrow agent keys, management system keys, etc.) to protect the secret from other devices participating in a protection pipeline. The other devices may include, for example, escrow agents (e.g., endpoint devices identified as having a security posture meeting prescribed criteria), management systems, and/or other devices. The encryption keys may be public keys of public-private keypairs. The other devices may maintain the private keys (e.g., decryption keys) of the public-private keypairs.

Once the encryption keys are obtained, secret management process 204 may sequentially encrypt a secret using the encryption keys to obtain a dual encrypted secret (e.g., 206), in this example where only two layers of encryption are applied to the secret. It will be appreciated that more layers of encryption may be applied, and/or different copies of the secret may be sequentially encrypted in various orders using the encryption keys to obtain any number of payloads that have been multiply encrypted any number of times using any number of keys. Different multiply encrypted secrets may be encrypted using different sequences of encryption keys thereby obtaining multiply encrypted secrets that require different sequences of decryption keys to decrypt the secrets.

The sequence of encryption keys used to obtain a multiply encrypted payload may be defined by a data protection pipeline definition (not shown). The encryption processes performed by secret management process 204 may be based on the protection pipeline definition. Refer to FIG. 2D for additional details regarding the protection pipeline definition.

Once obtained, the multiply encrypted secret may not be decryptable using information available to endpoint device 102. The necessary decryption keys may be locked in secret managers of escrow agents, management systems, and/or other types of devices. Consequently, the resulting payload (e.g., that includes the multiply encrypted secret) may meet the requirements of the security model (e.g., that the secret exported from secret manager 200 be stored in a location where decryption keys usable to gain access to the secret are available, except during recovery of the secret).

Once obtained, payload 208 may be provided to other devices for escrow. For example, payload 208 may be provided to a management system, escrow agent, and/or other devices. It will be appreciated that multiple payloads may be generated in this manner that include multiply encrypted secrets that require various sequences of decryption keys to be used to obtain access to include the secret. The number of such payloads generated may be based on the protection pipeline definition, which may be based on other considerations as described in more detail with respect to FIG. 2D.

Turning to FIG. 2B, a second data flow diagram in accordance with an embodiment is shown. The second data flow diagram may illustrate data used in and data processing performed in escrowing of multiply encrypted secrets and restoration of secrets.

To escrow multiply encrypted secrets, escrow agent 209 (e.g., similar to any of escrow agents 205) obtain payload 208. However, payload 208 may include the multiply encrypted secret or a singly encrypted secret (e.g., 210). For example, if a protection pipeline definition includes a management system that does not act as an escrow agent, the management system may decrypt an outer layer of encryption of the multiply encrypted secret before passing payload 208 to escrow agent 209 for storage. Or the management system may act as an escrow agent and return the payload with the multiply encrypted secret is maintained. Thus, payload 208 may include the original multiply encrypted, or a payload that includes a lesser number of layers of encryption (e.g., singly encrypted if two layers of encryption were originally applied).

Payload 208 may be obtained either (i) during a backup process with escrow agent 209 serving as long term storage for the payload, or (ii) during a recovery of the secret. For example, escrow agent 209 may obtain a work order to perform the recovery and if verifiable (e.g., by checking a signature using verification repository 202B), escrow agent 209 may be perform secret management process 212.

During secret management process 212, escrow agent 209 may (i) verify that other entities participating in a recovery meet security requirements (e.g., by sending challenges and receiving responses that may be verified using verification repository 202B, such as checking for signatures that require use of private keys maintained by the secret managers of the other devices), and if the other entities meet the security requirements (ii) decrypt a layer of encrypt applied to the secret using a key maintained by secret manager 200B, and if escrow agent 209 is a last escrow agent in a data protection pipeline, (iii) re-encrypt the decrypted secret using an encryption key (e.g., a public key for an endpoint device for which the recovery is being performed and will use the secret) for an endpoint device (e.g., replaced secret manager or new endpoint device with different secret manager) for which the secret recovery is performed.

The resulting payload (e.g., 216) may either be (i) a reduced encryption payload that includes a secret that is still encrypted but with reduced layers of encryption from when obtained by escrow agent 209, or (ii) a re-encrypted payload that includes a secret that was re-encrypted using a new encryption key for the endpoint device that will use the secret. Depending on the type of payload 216, the payload may either be forwarded to another escrow agent along the data protection pipeline or the endpoint device for which the recovery is performed. If forwarded to another escrow agent, a process similar to that shown in FIG. 2B may be performed. In contrast, if forwarded to the endpoint device for which the recovery process is being performed, the encrypted secret may be used by the endpoint device for various purposes.

Turning to FIG. 2C, a third data flow diagram in accordance with an embodiment is shown. The third data flow diagram may illustrate data used in and data processing performed in use of a recovered secret by an endpoint device.

To use a recovered secret, an endpoint device (e.g., 104) may obtain a payload that includes a singly encrypted secret (e.g., as described with respect to FIG. 2B). To use the secret, endpoint device 104 may perform secret management process 220. During secret management process 220, a decryption process may be performed using a decryption key maintained by secret manager 200C to obtain secret 222 (e.g., the secret from secret manager 200A). The decryption key may be a private key corresponding to a public key (e.g., endpoint key shown in FIG. 2B) used to apply the single layer of encryption protecting the secret.

Once obtained, secret 222 may be used to perform various processes. For example, if secret 222 is a volume management key previously used to obtain encrypted data 224, decryption process 226 may be performed using secret 222 to obtain decrypted data 228. Consequently, encrypted data 224 may be recovered even though a secret manager that encrypted the data is unavailable (e.g., due to destruction, inoperability, etc.).

Secret 222 may be used for other purposes. For example, secret 222 may be added to secret manager 200C (thereby facilitating continued protection and use of the secret), may be used to sign various data structures, and/or may be used for other purposes.

Thus, as seen in FIGS. 2A-2C, embodiments disclosed herein may facilitate backup and recovery of secrets for endpoint devices. Throughout the backup process, a security model may be enforced that reduces the likelihood of secrets that are backed up from being compromised while not protected by secret managers. The security model may enforce (i) separation between multiply encrypted secrets and decryption keys required to access the secrets, and (ii) security posture standards on devices participating in protection pipelines (e.g., groups of devices used to generate, escrow, and recover secrets).

However, to successfully recovery secrets using a protection pipeline, at least one copy of a multiply encrypted secret and corresponding decryption keys must be available. To improve the likelihood of being able to recovery secrets, the system shown in FIG. 1 may establish, monitor, and update protection pipelines over time based on the relative importance of being able to recover corresponding secrets. Accordingly, different secrets may be protected using different quantities of resources, depending on the relative importance of the secret.

Additionally, the system of FIG. 1 may establish protection pipelines and provide different levels of security for different types of secrets based on the relative importance of the secret. Further, the system of FIG. 1 may prioritize establishment of protection pipelines for secrets based on the relative importance of the secret.

Turning to FIG. 2D, a fourth data flow diagram in accordance with an embodiment is shown. The fourth data flow diagram may illustrate data used in and data processing performed in establishment of protection pipelines.

A protection pipeline may be established to obtain, protect, and recover secrets of endpoint devices (and/or other types of devices). A protection pipeline may include an originating device that has a secret to protect, and any number of intermediary devices such as escrow agents and management systems that store copies of multiply encrypted secrets and recover the secrets.

To establish a protection pipeline, a key management system or other system may orchestrate generation of protection pipeline definitions 236. Protection pipeline definitions 236 may define membership and roles in a protection pipeline. For example, protection pipeline definitions 236 may specify (i) how secrets are to be protected, and (ii) roles of devices participating in the protection pipeline.

To specify how secrets are to be protected, protection pipeline definitions 236 may indicate numbers and types of multiply encrypted payloads that are to be generated and escrowed for future use. For example, various copies of a given secret may be multiply encrypted using different sequences of encryption keys to obtain multiply encrypted secrets with different layers of encryption. Consequently, different sets of devices may decrypt different multiply encrypted secrets. By distributing the multiply encrypted secrets across different fault domains and distributing the devices necessary to participate in decryption processes across different fault domains, it may be less likely that the secret is unable to be recovered due to various devices failures that may occur. The number, type, and distribution of the multiply encrypted secrets may be selected based on various considerations such as importance of each secret. A user or automated system may classify secrets with respect to levels of importance, thereby allowing for automated selection of number, types, and distributions of multiply encrypted secrets.

To obtain protection pipeline definitions 236 (e.g., for a given secret), protection pipeline process 232 may be performed. During protection pipeline process 232, information regarding how the secret should be protected and resources available to protect the secret may be obtained.

To obtain the information regarding how the secret is to be protected, protection pipeline requirements 230 may be obtained. Protection pipeline requirements 230 may specify expectations regarding the protection to be provided to secrets. For example, protection pipeline requirements 230 may specify numbers and types (e.g., encryption sequences) of multiply encrypted secrets that are to be generated, expected distributions of the secrets across fault domains (e.g., ensuring that some escrow agents are located on different coasts of the United States to reduce the likelihood of all of the escrow agents necessary to access the secret becoming unavailable). Protection pipeline requirements 230 may be obtained via user input (e.g., a user may specify the requirements), or automated processes (e.g., the type of the secret, sources of the secret, etc. may be associated with the requirements, which may be previously established by a subject matter expert).

To obtain information regarding the resources available to protect the secrets, information may be retrieved from system descriptions 234. System descriptions 234 may include information regarding escrow agents, endpoint devices, and/or other components of FIG. 1. The information may be updated over time, and may include, for example, (i) availability for a device to participate in a pipeline (e.g., based on uptime, connectivity, location, etc.), (ii) fault domain membership (e.g., geographic location), (iii) security domain membership (e.g., security location, based on other devices that have authority over a device) (iv) computing resource availability, (v) security posture (e.g., able to respond to security challenges with cryptographically verifiable responses), and/or other considerations regarding the states of devices that may participate in protection pipelines.

Based on the gathered information, protection pipeline process 232 may populate protection pipeline definitions 236. For example, protection pipeline process 232 may identify (i) numbers of multiply encrypted secrets to generate, (ii) select sequences of encryption to be applied to the secrets, and (iii) select escrow agents/management systems to participate in the selected sequences of encryption and escrow the multiply encrypted secrets based on the ability of these devices to meet protection pipeline requirements 230.

The resulting protection pipeline definitions 236 may be distributed to the corresponding devices. Once distributed, automation frameworks of the receiving devices may automatically coordinate participation in the protection pipelines. Refer to FIGS. 2E-2G for additional details regarding participating in protection pipelines.

Once a protection pipeline definition is established, the system of FIG. 1 may continuously monitor the entities implementing the pipeline for compliance with the protection pipeline definition. If deviation from the protection pipeline definition is identified, then the deviation may be automatically corrected by, for example, replacing entities in the pipeline, generating additional copies of multiply encrypted secrets, sending alerts, and/or otherwise notifying administrators of the deviation and documenting the deviation.

To monitor the protection pipeline for compliance, the system of FIG. 1 may actively challenge entities of a pipeline. For example, to verify required security postures, cryptographic challenges may be issued over time and verified. In another example, to verify that decryption/ encryption keys are available, key challenges may be issued over time and verified. In a further example, to verify that copies of payloads are escrowed, challenges for the payloads may be issued over time and verified.

Any of the above may be verified, for example, by requesting the data (or hashes or other representative data of the to-be-verified data such as a key), by asking for proof of possession of the data (e.g., two-way challenge response), etc. In this manner, a protection pipeline may prove that it still has the ability to provide a protected secret over time.

In some cases, it may not be possible to continue to comply with a protection pipeline definition. In such scenarios, deviations may be allowed and documented until the deviations may be automatically addressed. When a deviation that cannot be remediated occurs, the protection pipeline definition may be reevaluated.

Once a protection pipeline definition is established, the corresponding protection pipeline may be implemented and used to protect secrets.

Turning to FIG. 2E, a fifth data flow diagram in accordance with an embodiment is shown. The fifth data flow diagram may illustrate data used in and data processing performed in implementation and use of protection pipelines.

To implement a protection pipeline, a protection pipeline definition (e.g., 240) may be deployed to any number of endpoint devices 242 and/or management systems (e.g., 252, if a management system escrows the payload rather than an endpoint device, drawn with dashed outline in FIG. 2E to indicate that it may not be present in protection pipelines). Once deployed, automation software may configure the endpoint devices to participate in a protection pipeline. In FIG. 2E, an example result of performing the automation process is illustrated on the right hand side of the figure (e.g., to the right of the oversized arrow).

In this example protection pipeline, endpoint device 244 may have a secret to be protected. To protect the secret, any number of the endpoint devices may operate as escrow agents 246. Once configured, public keys from the escrow agents (e.g., 248, 250) and management system 252 (in this example, a management system is serving as the storage for the payload until a recovery for a protected secret is performed) may be provided to endpoint device 244.

Once obtained, endpoint device 244 may obtain a payload that includes a multiply encrypted copy of the secret. To do so, the secret may be encrypted with the encryption keys in a predefined sequence. Thus, to obtain the secret, the layers of encryption may need to be decrypted in a reverse sequence (last to first). The payload may then be distributed to the escrow agents (or one of them), and/or management system 252 for storage until a recovery for the secret is performed.

While illustrated here with respect to generating a multiply encrypted payload with a single sequence, it will be appreciated that a protection pipeline may utilize multiple protection pipeline definitions that define how multiple multiply encrypted secrets are generated using different encryption sequences and stored in various locations.

Once escrowed with the escrow agents and/or management system, the payload may be used to recover the secret in the future.

Turning to FIG. 2F, a sixth data flow diagram in accordance with an embodiment is shown. The sixth data flow diagram may illustrate data used in and data processing performed in recovery of a secret. In FIG. 2F, the portion of the page above the horizontal line drawn in dashing indicates how a payload flows through a protection pipeline, and changes made along the way. The areas of the page below (i) each representation of an escrow agent, and (ii) below the dashed horizontal line, show representations of the payload at different points in time. In FIG. 2F, sequential encryptions (e.g., 256-258) applied to a secret (e.g., 260) are graphically illustrated as nested boxes. Removal of such a box indicates that a corresponding decryption process has been applied to remote the effect of the previously applied encryption.

To recover a secret, work orders for the recovery may be generated and sent to any number of escrow agents (e.g., 248-250) that participate in the protection pipeline. Once received, the escrow agents may cryptographically verify the work orders. Additionally, the escrow agents may validate the security posture of other devices participating the protection pipeline, and a target endpoint device to receive the recovered secret.

Once verified, the first escrow agent (e.g., 248) that has the payload may decrypt an outer layer of encryption. In this example, that may be encryption layer 256. Once decrypted, escrow agent 248 may forward the reduced payload to a next escrow agent (e.g., 249) in the protection pipeline. The next escrow agent may similarly decrypt the outermost layer of encryption. In this example, that may be encryption layer 257.

Once the next most outer layer of encryption is decrypted, the escrow agent (e.g., 249) may forward the further reduced payload (e.g., reduced applications of encryption) to other escrow agents along the protection pipeline until the payload reaches the last escrow agent (e.g., 250). The last escrow agent may remove the last layer of encryption (e.g., 258) thereby gaining access to secret 260.

However, free access to secret 260 may place secret 260 in jeopardy.

Turning to FIG. 2G, a seventh data flow diagram in accordance with an embodiment is shown. The seventh data flow diagram may illustrate data used in and data processing performed in recovery of a secret. In FIG. 2G, the portion of the page above the horizontal line drawn in dashing indicates how a payload flows through a protection pipeline, and changes made along the way. The areas of the page below (i) each representation of an escrow agent, and (ii) below the dashed horizontal line, show representations of the payload at different points in time.

Continuing with the discussion from FIG. 2F, to protect the now-available secret 260, a new layer (262) may be applied to secret 260. The new layer may be applied using a public key (e.g., an encryption key) for an endpoint device (e.g., 264) for which the secret is being recovered.

Once encrypted, the payload including the re-encrypted payload may be forwarded to endpoint device 264. New layer 262 may be decrypted thereby providing endpoint device 264 with access to secret 260.

However, to utilize the pipeline as shown in FIGS. 2F-2G, the members of the protection pipeline may need to be operating nominally, and the payload may need to be available.

Turning to FIG. 2H, an eighth data flow diagram in accordance with an embodiment is shown. The eighth data flow diagram may illustrate data used in and data processing performed in monitoring of a protection pipeline.

Once a protection pipeline is established, secret management process 272 may be performed by a key management system and/or other management device. During secret management process 272, various pipeline updates 270 may be obtained and used to update system description 234.

The pipeline updates 270 may be obtained by (i) self-initiated reports provided by the members of the protection pipeline, (ii) responses to challenges made to members of the protection pipeline, and/or via other methods.

For example, over time the members of the protection pipeline may analyze their operating condition, and provide information regarding their operating condition to management systems.

In another example, a challenge may be issued to a protection pipeline member. The challenge may demand information usable to verify that the member retains capability to participate in the protection pipeline, and/or that data structures necessary for the protection pipeline to operate are available. For example, the challenge may demand a signature that is verifiable using a key, a hash of a data structure (or other type of derived data), and/or other types of verifiable data.

When obtained, system description 234 may be updated so that an up to date representation of the protection pipeline (and/or other devices) is available. The information from system description 234, as noted above, may be used to ascertain whether the members of a protection pipeline are meeting a corresponding protection pipeline definition, which may specify numbers and types of payloads that are to be escrowed, capabilities of members of the protection pipeline, etc.

By doing so, a system in accordance with an embodiment may be more likely to be able to recover secrets in the future. For example, by escrowing multiple copies of secrets encrypted using different sequences of encryption keys, it may be less likely that all copies of the secrets may be lost. Further, by ensuring that the corresponding members of the protection pipeline continue to have access to the decryption keys necessary to decrypt the multiply encrypted payloads, the secrets may be more likely to be obtained from the payloads.

Thus, using the flows illustrated in FIGS. 2A-2H, a system in accordance may backup and recover secrets. When doing so, the secrets may be maintained in accordance with a security model that secures the secrets against compromise through protective identification of security posture of various devices.

As discussed above, the components of FIG. 1 may perform various methods to manage the operation of and/or interactions between endpoint devices. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing secrets in accordance with an embodiment is shown. The method may be performed by any of endpoint devices 100, escrow agents 105, management systems 110, key management systems 115, and/or other components of the system shown in FIG. 1.

Prior to operation 300, an endpoint device may participate in a backup process for one of its secrets. The secret may be multiply encrypted and escrowed with an escrow agent. A secret manager of the endpoint device and/or the endpoint device may become inoperable. The secret manager and/or the endpoint device may be replaced (e.g., with a replacement secret manager/new endpoint device that includes a new secret manager). To facilitate use of the secret by the replacement manager/device, a restoration for the secret may be initiated.

At operation 300, performance of a first decryption process for a multiply encrypted copy of the secret is initiated to obtain a first singly encrypted copy of the secret. The first decryption process may be performed using a first decryption key. The performance may be initiated by sending a work order for the recovery to an escrow agent. The escrow agent may validate the work order, and perform the first decryption process as part of the recovery.

Once decrypted the singly encrypted copy of the secret may be provided to another escrow agent that is a member of a protection pipeline for the secret. The other escrow agent may hold a decryption key for the single layer of encryption applied to the secret.

At operation 302, performance of a second decryption process for the singly encrypted copy of the secret is initiated to obtain a copy of the secret. The second decryption process may be performed using a second decryption key. The performance may be initiated by sending a work order for the recovery to the other escrow agent. The other escrow agent may validate the work order, and perform the second decryption process as part of the recovery.

At operation 304, performance of a first encryption process for the copy of the secret is initiated to obtain a second singly encrypted copy of the secret. The performance may be initiated by the work order for the recovery. The first encryption process may encrypt the copy of the secret using a public key for a target endpoint device for which the recovery for the key is performed.

At operation 306, the second singly encrypted copy of the secret is provided to a new endpoint device. The new endpoint device may be new because it has had its secret manager replaced but had previously used the secret, or may be a different endpoint device that had never used the secret previously. The second singly encrypted copy of the secret may be provided by sending it to the new endpoint device, by storing it in a prescribed location, and/or via other methods.

At operation 308, the second singly encrypted copy of the secret is decrypted to obtain the copy of the secret. The decryption may be performed by invoking a function of a secret manager of the new endpoint device, which may use a decryption key corresponding to the encryption key used to re-encrypt the copy of the secret at operation 304.

At operation 310, the copy of the secret is used to access data secured by the copy of the secret. The data may be accessed by decrypting an encrypted copy of the data using the copy of the secret. For example, the secret may be a symmetric encryption key used to secure the data prior to the restoration of the secret.

At operation 312, the data is used to continue provisioning of computer implemented services provided by an original endpoint device that secured the data using the secret. The computer implemented services may continue to be provided by reading and/or modifying the data, and performing various actions based on the data.

The method may end following operation 312.

Figure 4:
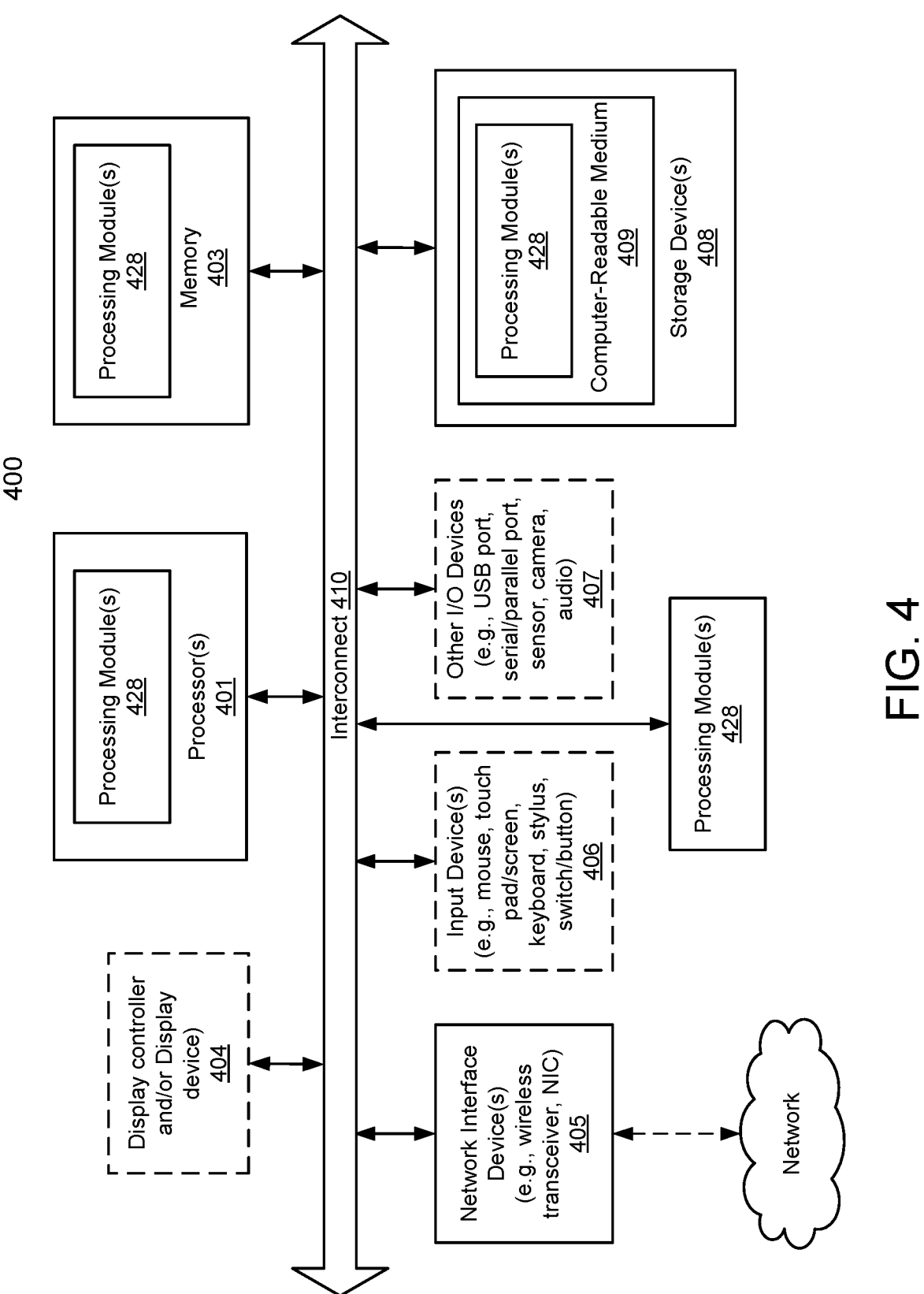
FIG. 4 shows a block diagram illustrating a data processing system in accordance with an embodiment.

Any of the components illustrated in FIGS. 1-2H may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components.

These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a secret in a distributed system, the method comprising:

initiating performance of a first decryption process for a multiply encrypted copy of the secret to obtain a first singly encrypted copy of the secret, the first decryption process being performed with a first decryption key, the multiply encrypted copy of the secret is obtained through encryption using at least two encryption keys, the at least two encryption keys being public keys for at least two endpoint devices, and the at least two endpoint devices each meeting security posture requirements for serving as escrow agents for the secret;

initiating performance of a second decryption process for the first singly encrypted copy of the secret to obtain the copy of the secret, the second decryption process being performed with a second decryption key;

initiating performance of a first encryption process for the copy of the secret to obtain a second singly encrypted copy of the secret;

providing the second singly encrypted copy of the secret to a new endpoint device;

decrypting, by the new endpoint device, the second singly encrypted copy of the secret to obtain the copy of the secret;

using, by the new endpoint device, the copy of the secret to access data secured by the copy of the secret; and using, by the new endpoint device, the data to continue provisioning of computer implemented services provided by an original endpoint device that secured the data using the secret.

2. The method of claim 1, further comprising:

prior to initiating the performance of the first decryption process:

multiply encrypting, by the original endpoint device, the secret using at least two public keys to obtain the multiply encrypted copy of the secret; and remotely escrowing the multiply encrypted copy of the secret.

3. The method of claim 2, wherein the at least two public keys comprise a first public key that is a member of a first key pair comprising the first decryption key and a second public key that is a member of a second key pair comprising the second decryption key.

4. The method of claim 3, wherein the second decryption key is a private key maintained by an escrow agent, wherein the escrow agent performs the second decryption process and the first encryption process.

5. The method of claim 4, wherein the first encryption process is performed using a public key for the new endpoint device.

6. The method of claim 4, further comprising:

prior to multiply encrypting the secret:

identifying a security posture of a second escrow agent; and making a determination whether the security posture of the second escrow agent meets a security posture criteria;

in a first instance of the determination where the security posture of the second escrow agent does not meet the security posture criteria:

identifying a security posture of the escrow agent; and making a determination whether the security posture of the escrow agent meets a security posture criteria;

in a first instance of the determination where the security posture of the escrow agent meets the security posture criteria:

selecting the escrow agent over the second escrow agent for membership in a protection pipeline used to protect the secret.

7. The method of claim 4, further comprising:

after obtaining the first singly encrypted copy of the secret:

storing the first singly encrypted copy of the secret with the escrow agent until an occurrence of a restoration event for the secret, wherein the performance of the second decryption process is initiated responsive to the occurrence of the restoration event.

8. The method of claim 7, wherein the restoration event is selection of the new endpoint device as a replacement for the original endpoint device, and the new endpoint device being selected for replacement due to a failure of at least a secret management component of the original endpoint device that maintained the secret for the original endpoint device.

9. The method of claim 1, wherein the secret is a volume management key.

10. A non-transitory machine-readable medium having instructions stored therein, which when executed by at least one processor, cause a system to perform system first operations for managing a secret in a distributed system, the system first operations comprising:

initiating performance of a first decryption process for a multiply encrypted copy of the secret to obtain a first singly encrypted copy of the secret, the first decryption process being performed with a first decryption key, the multiply encrypted copy of the secret is obtained through encryption using at least two encryption keys, the at least two encryption keys being public keys for at least two endpoint devices, and the at least two endpoint devices each meeting security posture requirements for serving as escrow agents for the secret;

initiating performance of a second decryption process for the first singly encrypted copy of the secret to obtain the copy of the secret, the second decryption process being performed with a second decryption key;

initiating performance of a first encryption process for the copy of the secret to obtain a second singly encrypted copy of the secret;

initiating providing the second singly encrypted copy of the secret to a new endpoint device;

initiating decryption, by the new endpoint device, the second singly encrypted copy of the secret to obtain the copy of the secret;

initiating using, by the new endpoint device, the copy of the secret to access data secured by the copy of the secret; and initiating using, by the new endpoint device, the data to continue provisioning of computer implemented services provided by an original endpoint device that secured the data using the secret.

11. The non-transitory machine-readable medium of claim 10, wherein the operations further comprise:

prior to initiating the performance of the first decryption process:

multiply encrypting, by the original endpoint device, the secret using at least two public keys to obtain the multiply encrypted copy of the secret; and remotely escrowing the multiply encrypted copy of the secret.

12. The non-transitory machine-readable medium of claim 11, wherein the at least two public keys comprise a first public key that is a member of a first key pair comprising the first decryption key and a second public key that is a member of a second key pair comprising the second decryption key.

13. The non-transitory machine-readable medium of claim 12, wherein the second decryption key is a private key maintained by an escrow agent, wherein the escrow agent performs the second decryption process and the first encryption process.

14. The non-transitory machine-readable medium of claim 13, wherein the first encryption process is performed using a public key for the new endpoint device.

15. The non-transitory machine-readable medium of claim 10, wherein the secret is a volume management key.

16. A data processing system, comprising:

a processor; and a memory coupled to the processor to store instructions, which when executed by the processor, cause the data processing system to perform operations for managing a secret in a distributed system, the operations comprising:

initiating performance of a first decryption process for a multiply encrypted copy of the secret to obtain a first singly encrypted copy of the secret, the first decryption process being performed with a first decryption key, the multiply encrypted copy of the secret is obtained through encryption using at least two encryption keys, the at least two encryption keys being public keys for at least two endpoint devices, and the at least two endpoint devices each meeting security posture requirements for serving as escrow agents for the secret;

initiating performance of a second decryption process for the first singly encrypted copy of the secret to obtain the copy of the secret, the second decryption process being performed with a second decryption key;

initiating performance of a first encryption process for the copy of the secret to obtain a second singly encrypted copy of the secret;

initiating providing the second singly encrypted copy of the secret to a new endpoint device;

initiating decryption, by the new endpoint device, the second singly encrypted copy of the secret to obtain the copy of the secret;

initiating using, by the new endpoint device, the copy of the secret to access data secured by the copy of the secret; and initiating using, by the new endpoint device, the data to continue provisioning of computer implemented services provided by an original endpoint device that secured the data using the secret.

17. The data processing system of claim 16, wherein the operations further comprise:

prior to initiating the performance of the first decryption process:

multiply encrypting, by the original endpoint device, the secret using at least two public keys to obtain the multiply encrypted copy of the secret; and remotely escrowing the multiply encrypted copy of the secret.

18. The data processing system of claim 17, wherein the at least two public keys comprise a first public key that is a member of a first key pair comprising the first decryption key and a second public key that is a member of a second key pair comprising the second decryption key.

19. The data processing system of claim 18, wherein the second decryption key is a private key maintained by an escrow agent, wherein the escrow agent performs the second decryption process and the first encryption process.

20. The data processing system of claim 19, wherein the first encryption process is performed using a public key for the new endpoint device.

\* \* \* \* \*